UNITED STATES PATENT OFFICE.

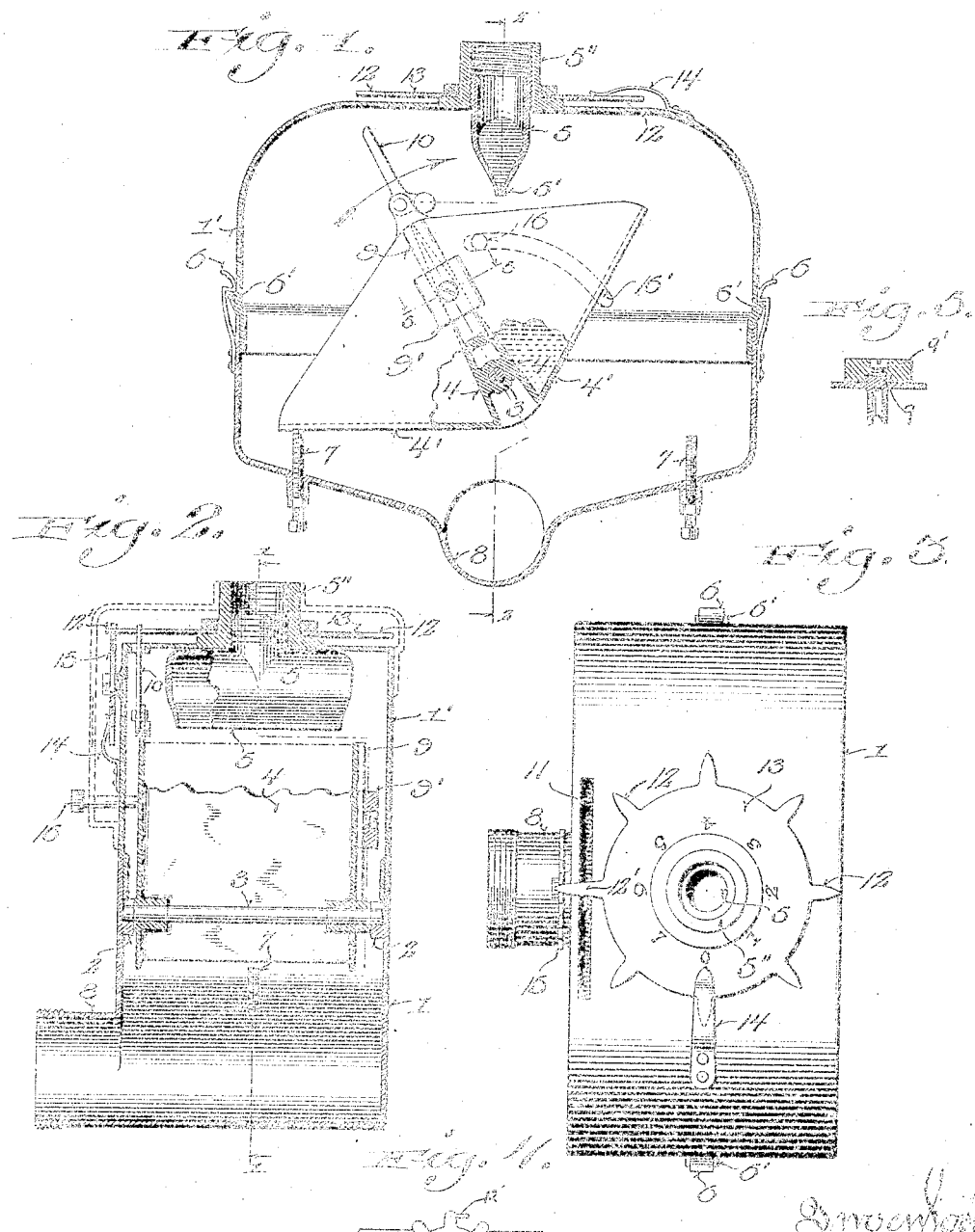

RICHARD F. DOWNEY, OF MILWAUKEE, WISCONSIN, ASSIGNOR OF ONE-HALF TO HUGO LOEWENBACH, OF MILWAUKEE, WISCONSIN.

MEASURING DEVICE.

1,143,109.   Specification of Letters Patent.   Patented June 15, 1915.

Application filed January 22, 1914. Serial No. 813,699.

*To all whom it may concern:*

Be it known that I, RICHARD F. DOWNEY, a citizen of the United States, and resident of Milwaukee, in the county of Milwaukee and State of Wisconsin, have invented certain new and useful Improvements in Measuring Devices; and I do hereby declare that the following is a full, clear, and exact description thereof.

The object of my invention is to provide a simple, economical and accurate device for measuring either liquid or granulated substances, the invention being particularly adapted for use in connection with measuring oil that is discharged from a pump or supplied by gravity.

The invention further contemplates the application of a register in connection with the measuring apparatus, whereby the units or multiple of such units passing through the apparatus are recorded.

A further object of my invention is to provide means in connection with the movable element of the device, whereby the measuring unit may be varied as to weight or bulk.

With the above and other minor objects in view the invention consists in certain peculiarities of construction and combination of parts as hereinafter set forth with reference to the accompanying drawings and subsequently claimed.

In the drawings Figure 1 represents a central sectional elevation of a measuring device embodying the features of my invention, the section being indicated by line 1—1 of Fig. 2; Fig. 2, a transverse central section of the same, the section being indicated by line 2—2 of Fig. 1; Fig. 3, a plan view of the measuring device; Fig. 4, a detailed face view of one member of a register mechanism, and Fig. 5, a detailed cross-section illustrating an adjustable weight for regulating the amounts to be weighed or measured.

Referring by characters to the drawings, 1, 1', represent the hopper and lid members respectively of a two-part housing. The walls of the hopper member 1 are provided with inwardly projecting ears 2, which ears form journals for the reception of a trunnion rod 3, the same being centrally fitted to an oscillatory receiving cup adjacent to the bottom of the same. The receiving cup is provided with a centrally disposed division wall 4 and the bottom walls 4', 4', are flared upwardly and in opposite directions from the point of oscillation as shown to form discharge mouths for the compartments of said receiving cup, which compartments are upon opposite sides of the trunnion rod 3, it being understood that the said trunnion rod is vertically alined with a delivery nozzle 5, which nozzle extends through the upper wall of the housing lid member. The mouth 5' of the nozzle is transversely widened and contracted to form a narrow slit, whereby the flow of material therefrom will take the form of a thin sheet, which sheet is discharged directly over the fulcrum point of the receiving cup. By this arrangement it is obvious that the receiving cup is balanced relative to its point of axis and will vibrate back and forth co-incident to discharge of material into either one or other of the compartments.

For convenience in assemblage the lid member of the housing is in slip-joint union with the hopper member and one of said members is provided with snap-dogs 6, which snap-dogs engage locking ears 6' that project from the opposite housing member. In order to limit movement of the receiving cup in either direction, the bottom of the hopper has projecting therethrough a pair of adjustable cup-engaging studs 7, which studs come in contact with the bottom of the receiving cup when the latter is swung downward to a discharging position. The hopper member 1 is also provided with a discharge nozzle 8, whereby the contents of the housing, after being measured, are delivered to a suitable receptacle.

The delivery nozzle of the housing is provided with an upwardly extending neck portion 5'', which neck portion is internally threaded for connection to a supply pipe or to the nozzle of a pump, not shown. One of the side walls of the receiving cup is provided with a fin 9, which fin is in alinement with the division wall and is provided for the reception of a weight 9' that is in dovetailed connection therewith, being so arranged for adjustment up or down with relation to the pivot-point of the receiving cup, whereby the amount of material being weighed may be regulated due to the fact that the said weight will prevent tilting of the cup until such time as a desired amount of material has flowed into one of its compartments. One of the side walls of the receiving cup is also provided with a weight-controlled tappet-finger 10, which tappet finger is in pivotal union with the cap wall and adapted to resist strain in one direction only and to yield in opposition to strain in the other direction. The upper end of the tappet finger is arranged to enter a slot 11 that is formed in the top wall of the hopper member and project above said wall when in an intermediate position relative to the point of oscillation of the receiving cup.

In describing an arc about the point of axis of the receiving cup the tappet finger is arranged to successively engage a series of teeth 12 of a registering dial 13, which dial is revolubly mounted upon the neck 5' of the receiving nozzle. The said dial is held against inadvertent movement by a friction spring 14 which is carried by the lid and adapted to engage the face of the dial. One of the teeth 12' of this dial is of greater length than the series and the said tooth is adapted to engage successively the teeth of a second registering dial 15, which latter dial is mounted upon the side wall of the housing lid member. The teeth of the dial 13 represent the units of measurement relative to the compartments of the receiving cup as, for example, when the cup is in the position shown in Fig. 1, after the flow of liquid from the nozzle has filled the compartment to a degree whereby the preponderance of weight of said liquid will overcome the weight of the cup, the said filled receiving cup will swing downward or in the direction as indicated by the arrow and thus dump its contents into the hopper. Coincident to the swinging movement the tappet finger will engage and ride under the tooth 12 of the dial 13, which tooth is now extended across the slot 11, as best shown in Fig. 3, and coincident to the division wall 4 having passed the mouth of the delivery nozzle 5', the liquid flowing from said mouth will be directed into the now empty compartment, into which said liquid will continue to flow and the receiving cup will come to rest upon the stop-pin at the opposite side of the trunnion, it being borne in mind that the contents of the bucket previously filled is now discharged and that the preponderance of weight has been reversed. The measured quantity of liquid or other article being operated upon will now fill the compartment and the weight of the material will again cause the receiving cup to oscillate back to the position shown in Fig. 1. During this return movement the tappet-finger 10 will engage one of the teeth 12 of the dial and cause said dial to rotate a distance of one tooth. Thus after the receiving cup has measured and discharged the second batch of material the registering dial will indicate a unit as, for example, should the compartments of the receiving cup each contain a half pint, after two half pints have been measured and discharged the dial would show one pint. Hence with each complete revolution of the dial the long tooth 12' will be positioned for engagement with the tappet-finger and when said long tooth is acted upon it will engage one of the teeth of the registering dial 15, whereby said dial will be moved one tooth, indicating one gallon.

It should be understood that the registering device just mentioned may be incased, as indicated by dotted lines in Fig. 2 and that, while I have shown only two registering dials, the said registering device can be multiplied indefinitely and varied to indicate any series or multiple thereof of known measuring units.

In order to check up the apparatus and prevent confusion in measuring, it is preferable at all times to start a measuring operation when the receiving cup is in the position shown in Fig. 1, in which position the tappet finger will start upon its negative stroke, and hence, to indicate this position and also to permit manual adjustment of the receiving cup to its correct starting position, I provide the said cup with a manipulating pin 16. This pin projects from one side wall of the cup through a circular slot 16' that is formed in the housing lid and hence after the operator has obtained the desired number of units, should the cup be at rest in its finishing position rather than a starting position, the same may be manually shifted. It is also apparent that when the cut-off of flow occurred after a measuring operation, should the cup compartment under the flow nozzle receive a fractional part of the unit to be measured, upon the next measuring operation this unit will be completed.

While I have shown and described a specific exemplification of my invention, it is apparent that the structural features may be varied indefinitely within the knowledge of the skilled mechanic, attention being called to the fact that the generic principle embodies a vibratory receiving cup having a central partition, the cup being acted upon by a predeterminedly selected weight or quantity. Thus measurements of products can be effected without the use of gears or other mechanisms which would increase the cost of manufacture and also render the device sensitive to wear.

I claim:

In a measuring device having a delivery nozzle, a receiving cup pivoted thereunder, the pivot being contiguous to the bottom of the receiving cup and in alinement with the discharge nozzle, a central partition in the receiving cup arranged to vibrate across the line of discharge of the nozzle; the combination of a parallel edged dovetailed fin projecting from one wall of the cup and cast integral therewith, the fin being extended from the pivot point of said cup to its upper edge and paralleling the central partition thereof, a weight having a dovetailed groove in one face thereof for slidable engagement with the dovetailed fin, and a screw in threaded union with the weight adapted to frictionally engage the face of said fin whereby the weight is held in adjusted position.

In testimony that I claim the foregoing I have hereunto set my hand at Milwaukee in the county of Milwaukee and State of Wisconsin in the presence of two witnesses.

RICHARD F. DOWNEY.

Witnesses:
N. E. OLIPHANT,
M. E. DOWNEY.